(12) United States Patent
Luo et al.

(10) Patent No.: US 12,503,208 B2
(45) Date of Patent: Dec. 23, 2025

(54) TETHER MANAGE SYSTEM FOR OPTICAL FIBER REMOTE CONTROL SUBMERSIBLE

(71) Applicant: SHANGHAI OCEAN UNIVERSITY, Shanghai (CN)

(72) Inventors: Ruilong Luo, Shanghai (CN); Biao Wang, Shanghai (CN); Yu Wu, Shanghai (CN); Tingting Song, Shanghai (CN); Gaosheng Luo, Shanghai (CN); Jinfei Zhang, Shanghai (CN); Fang Wang, Shanghai (CN); Zhe Jiang, Shanghai (CN)

(73) Assignee: SHANGHAI OCEAN UNIVERSITY, Shanghai (CN)

( * ) Notice: Subject to any disclaimer, the term of this patent is extended or adjusted under 35 U.S.C. 154(b) by 490 days.

(21) Appl. No.: 18/082,039

(22) Filed: Dec. 15, 2022

(65) Prior Publication Data

US 2023/0202627 A1 Jun. 29, 2023

(30) Foreign Application Priority Data

Dec. 29, 2021 (CN) .......................... 202111634416.5

(51) Int. Cl.
| | |
|---|---|
| *B63G 8/00* | (2006.01) |
| *B63G 8/14* | (2006.01) |
| *G02B 6/44* | (2006.01) |

(52) U.S. Cl.
CPC ............... *B63G 8/001* (2013.01); *B63G 8/14* (2013.01); *G02B 6/4441* (2013.01); *B63G 2008/007* (2013.01)

(58) Field of Classification Search
CPC .... B63G 8/001; B63G 8/14; B63G 2008/007; G02B 6/4441; G02B 6/4427; B63C 11/34
See application file for complete search history.

(56) References Cited

FOREIGN PATENT DOCUMENTS

| | | | | |
|---|---|---|---|---|
| CN | 108540226 A | * | 9/2018 | ....... H04B 10/25891 |
| CN | 111045173 A | * | 4/2020 | ............. G02B 6/506 |

* cited by examiner

*Primary Examiner* — Anthony D Wiest
(74) *Attorney, Agent, or Firm* — Cooper Legal Group, LLC

(57) ABSTRACT

A TMS for an optical fiber remote control submersible is provided, including an upper cylinder equipped with a counterweight and a lower cylinder equipped with a buoy; the upper cylinder and the lower cylinder are sleeved with each other, and matched electromagnets and iron plates are respectively installed in the two parts; the upper cylinder is connected with a mother ship through a light armoured optical power cable, and the light armoured optical power cable may provide electric power for the electromagnets, and the lower cylinder is connected with a submersible through a light load-bearing optical fiber cable; and an end of the light armoured optical power cable inside the upper cylinder is optically connected with an end of the light load-bearing optical fiber cable inside the lower cylinder.

10 Claims, 5 Drawing Sheets

TETHER MANAGE SYSTEM FOR OPTICAL FIBER REMOTE CONTROL SUBMERSIBLE

CROSS-REFERENCE TO RELATED APPLICATIONS

This application claims priority to Chinese Patent Application No. 202111634416.5, filed on Dec. 29, 2021, the contents of which are hereby incorporated by reference.

TECHNICAL FIELD

The application relates to the field of diving equipment, and in particular to a tether manage system (TMS) for an optical fiber remote control submersible.

BACKGROUND

Tether manage system (TMS) is a transition link between a mother ship and a fiber-optic remotely operated submersible, and a main function is to eliminate an influence of a mother ship movement on the submersible. The TMS is normally divided into two categories, a top hat system and a garage system. The TMS is equipped with the submersible by a mechanical structure, carries out launch and recovery actions by a winch and an A-frame, carries out a signal transmission and a power supply and bears a hoisting load of the TMS and the submersible by armoured optical cables.

Firstly, for the top hat system, the submersible is carried under the top hat system and laid by a hook or latch mechanism; when separating, the hook or latch mechanism needs to be opened, and the submersible may cruise or dive freely; when recovering, the submersible needs to be pulled back by a cable twisting mechanism, and the hook or latch mechanism needs to be closed again.

Secondly, for the garage system, the submersible is located in an internal space of the garage, connected with the garage through a locking mechanism or a latch mechanism, and laid into water together with the garage; when separating, the locking mechanism or the latch mechanism needs to be opened, and the submersible actively moves out of a garage; when recovering, the submersible may actively move into the garage, or be pulled back by the cable twisting mechanism on the TMS, and then the locking mechanism or latch mechanism is closed.

It may be seen that due to a heavy weight of the submersible, complexities of a volume, a mass and a system of the TMS are large, higher requirements are put forward for the winch and an armoured optical and power composite cable for the launch and the recovery, thus limiting applications of the submersible in marine scientific investigation, seabed topographic mapping and other wider scenes.

SUMMARY

Therefore, aiming at the above technical problems, it is necessary to provide a tether manage system (TMS) for an optical fibre remote control submersible with a small dead-weight, a high applicability for clarifying requirements of an optical and power composite cable and a laying winch.

A TMS for an optical fibre remote control submersible includes an upper cylinder equipped with a counterweight and a lower cylinder equipped with a buoy; the upper cylinder and the lower cylinder are sleeved with each other, and matched electromagnets and iron plates are respectively installed in the two parts; the upper cylinder is connected with a mother ship through a light armoured optical and power composite cable, and the light armoured optical and power composite cable may provide electric power for the electromagnets, and the lower cylinder is connected with a submersible through a light load-bearing optical fibre cable; and an end of the light armoured optical and power composite cable inside the upper cylinder is optically connected with an end of the light load-bearing optical fibre cable inside the lower cylinder.

In an embodiment, a junction box is installed in the upper cylinder, and the light armoured optical and power composite cable is divided into an optical cable and power cables through the junction box.

In an embodiment, the power cables of the light armoured optical and power composite cable are electrically connected with the electromagnets, and the optical cable of the light armoured optical and power composite cable is optically connected with the light load-bearing optical fibre cable.

In an embodiment, an upper optical fibre package and a lower optical fibre package are respectively installed in the upper cylinder and the lower cylinder; the optical cable of the light armoured optical and power composite cable is connected into the upper optical fibre package, and the light load-bearing optical fibre cable is connected into the lower optical fibre package; and the optical cable of the light armoured optical power cable and the light load-bearing optical fibre cable respectively draw a part of optical fibres from the respective optical fibre package and connect each other optically.

In an embodiment, the upper cylinder and the lower cylinder transparent covers are respectively installed on opposite faces of the upper optical fibre package and the lower optical fibre package, and the optical cable of the light armoured optical and power composite cable and the light load-bearing optical fibre cable respectively draw a part of optical fibres from the respective optical fibre package to connect into the transparent covers.

In an embodiment, the electromagnets are circumferentially arranged along an inner wall of the upper cylinder; and the iron plates are circumferentially arranged along an inner wall of the lower cylinder, and correspond to each electromagnet one by one.

In an embodiment, load-bearing joints are fixed at one end of the lower cylinder far away from the upper cylinder, and the iron plates are fixed on the load-bearing joints by connecting rods passing through the lower cylinder.

In an embodiment, there is a tapered groove in the load-bearing joints, and a tip of the tapered groove faces away from the lower cylinder; the light load-bearing optical fibre cable passes through the tapered groove, and a stopper is solidified in the tapered groove.

In an embodiment, the light load-bearing optical fibre cable adopts a fibre material as a load-bearing layer.

In an embodiment, the light load-bearing optical fibre cable is also optically connected with a local optical fibre package in the submersible.

According to the TMS for the optical fibre remote control submersible, the upper cylinder and the lower cylinder are sleeved and combined with each other after the iron plates are attracted to the electromagnets, and the upper cylinder and the lower cylinder are separated after the iron plates are separated from the electromagnets. The TMS has a low dead-weight, low requirements for an armoured optical and power composite cable and a launch and recovery winch, thus improving an applicability of a system.

DETAILED DESCRIPTION OF THE EMBODIMENTS

In order to make an objective, a technical scheme and advantages of embodiments of the application clearer, the technical scheme in the embodiments of the application are clearly and completely explained below with reference to drawings in the embodiments of the application. Obviously, the described embodiments are parts of the embodiments of the application, but not all of them. Based on the embodiment of the application, all other embodiments obtained by ordinary technicians in a field without a creative labour are within a scope of the application.

Figure 1:
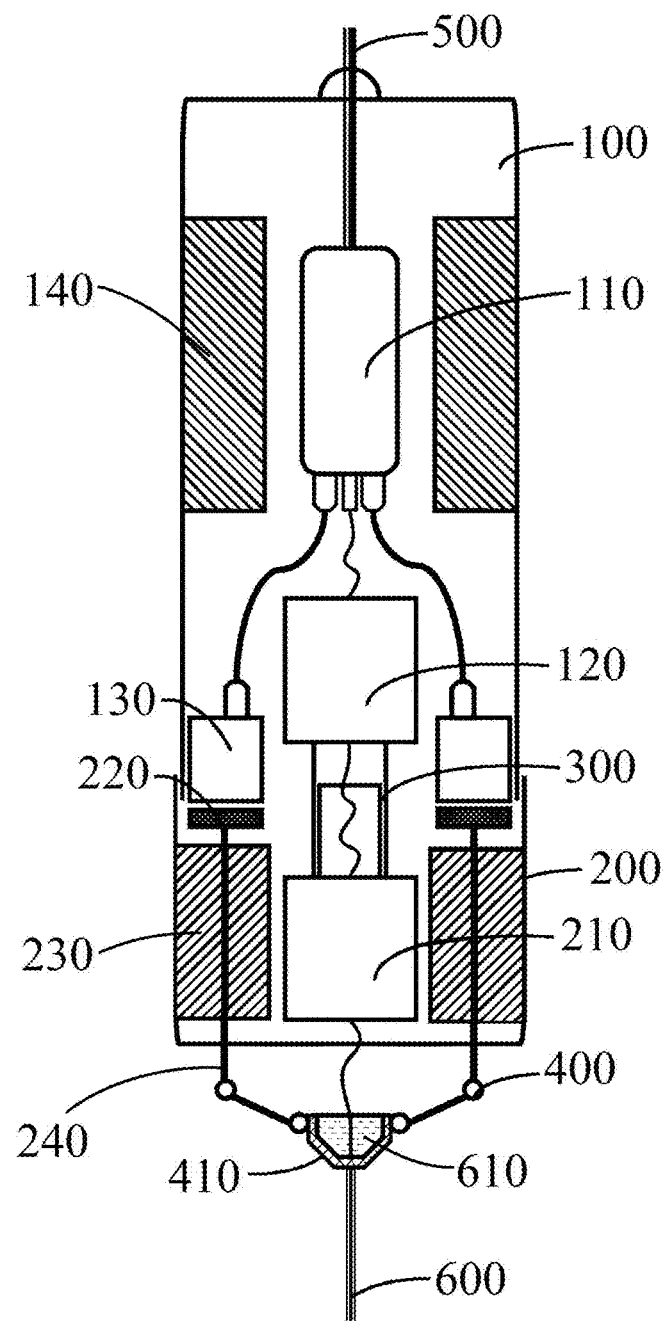
FIG. 1 is a schematic structural diagram of a tether manage system (TMS).

As shown in FIG. 1, in one embodiment, a tether manage system (TMS) for an optical fibre remote control submersible includes an upper cylinder 100 with a counterweight 140 and a lower cylinder 200 with a buoy 230; the upper cylinder 100 and the lower cylinder 200 are sleeved with each other, and matched electromagnets 130 and iron plates 220 are respectively installed in the two parts; the upper cylinder 100 is connected with a mother ship through a light armoured optical and power composite cable 500, and the light armoured optical and power composite cable 500 may provide electric power for the electromagnets 130, and the lower cylinder 200 is connected with a submersible through a light load-bearing optical fibre cable 600; and an end of the light armoured optical and power composite cable 500 inside the upper cylinder 100 is optically connected with an end of the light load-bearing optical fibre cable 600 inside the lower cylinder 200.

The TMS has a combination state and a separation state. During the combination, the light armoured optical and power composite cable 500 supplies power to the electromagnets 130 in the upper cylinder 100 of the TMS, and are attracted with the iron plates 220 in the lower cylinder 200. During the separation, the electromagnets 130 are powered off. Since the lower cylinder 200 of the TMS is in a positive buoyancy state as a whole, it is necessary to use an underwater weight of the submersible to pull the TMS apart.

Figure 2:
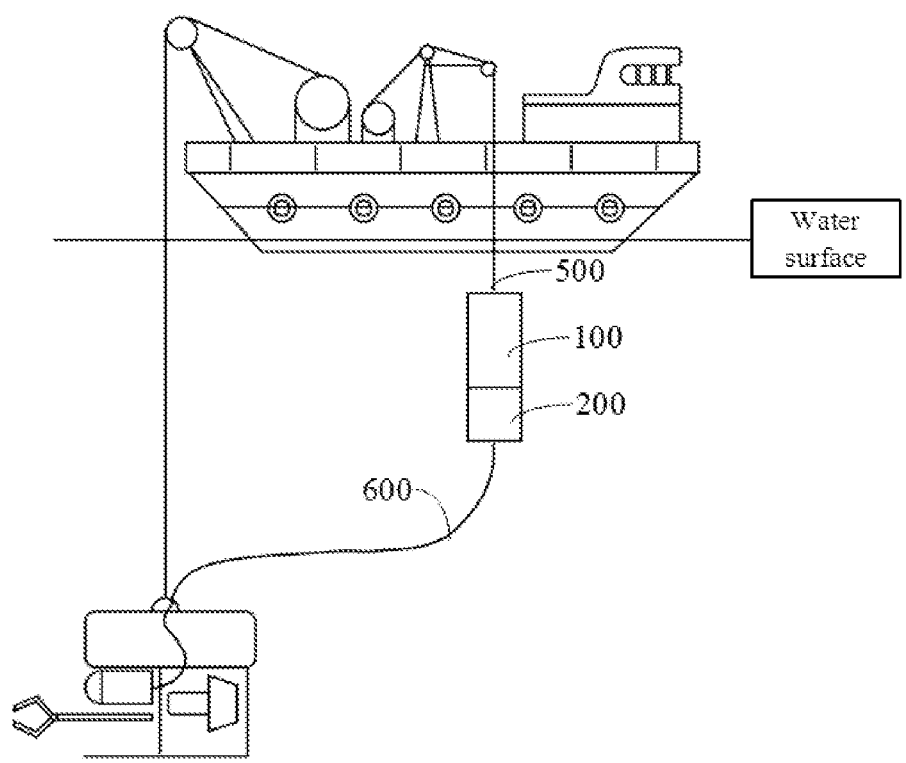
FIG. 2 is a schematic diagram of a tether manage system (TMS) in a first state of use.

As shown in FIG. 2, when in use, the submersible and the TMS are laid out separately. An unhooking device is arranged at an end of a steel cable of a conventional winch, connected with a lifting point of the submersible, and hoisted into the water. The electromagnets 130 are energized to attract the iron plates 220, and the TMS is in the combination state. The light armoured optical and power composite cable 500 is connected with the top lifting point of the TMS, and the TMS is hoisted into the water.

Figure 3:
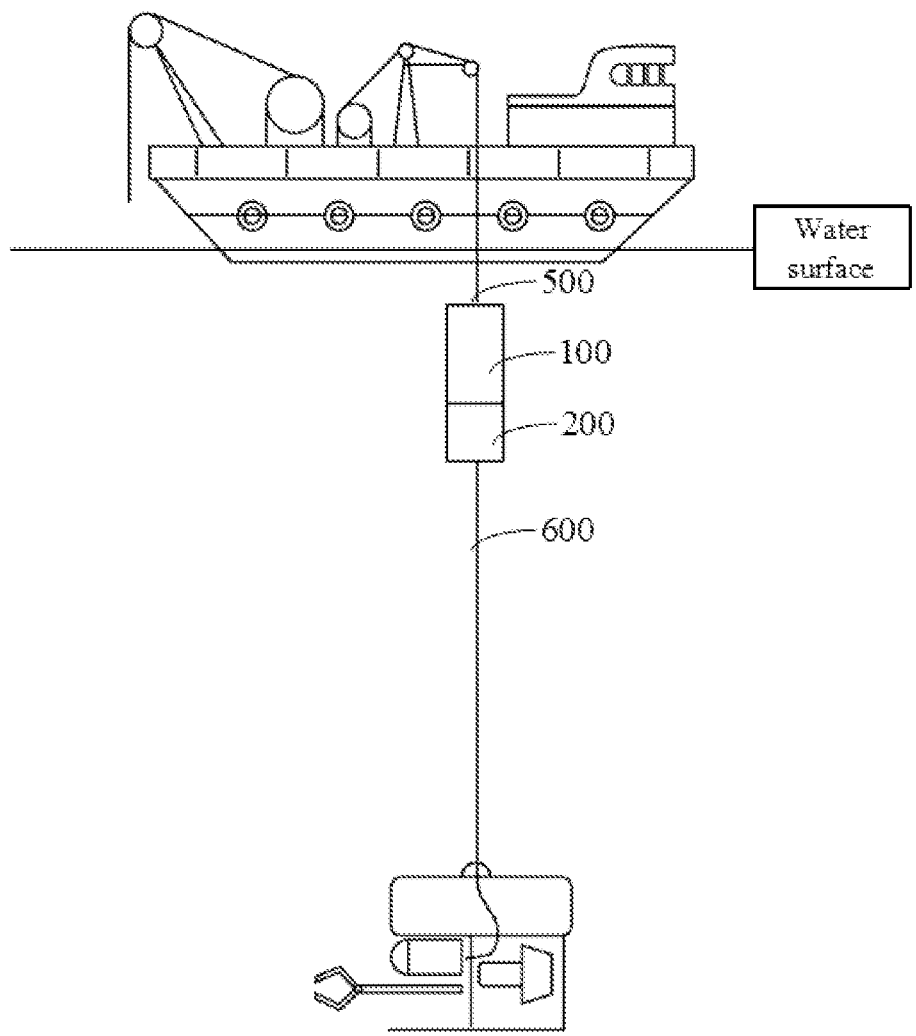
FIG. 3 is a schematic diagram of a tether manage system (TMS) in a second state of use.

As shown in FIG. 3, after entering the water, the unhooking device of the submersible may be turned on, and the TMS is lowered with a depth and a speed of a free dive of the submersible. The TMS stops being lowered to hover in the water after the submersible quickly leaves a stormy area on a water surface. Under an action of gravity and a traction force of the light load-bearing optical fibre cable 600, the submersible swings freely under the TMS and continues to descend to a specified depth.

Figure 4:
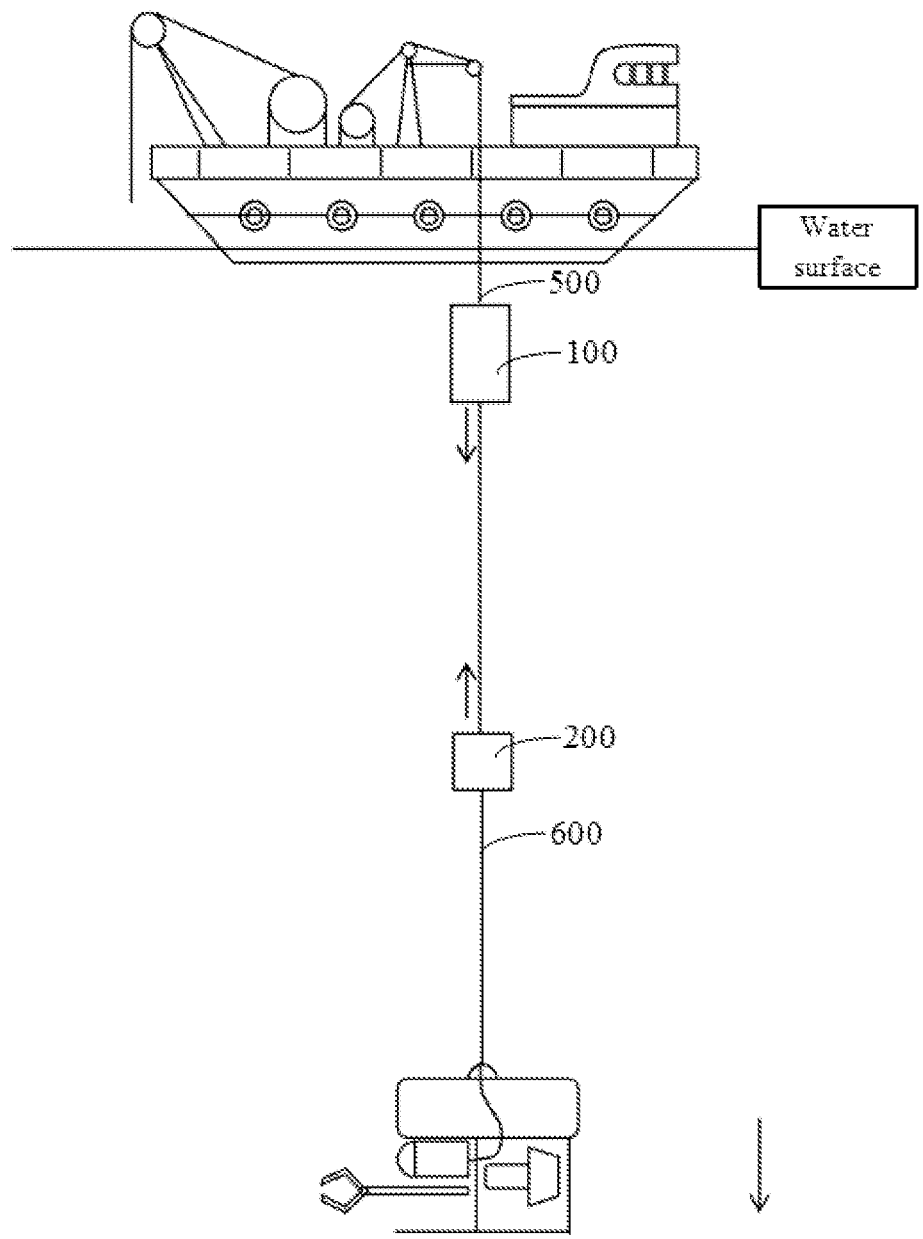
FIG. 4 is a schematic diagram of a tether manage system (TMS) in a third state of use.

As shown in FIG. 4, the electromagnets 130 are powered off, so that the electromagnets 130 and the iron plates 220 are no longer attracted. The upper cylinder 100 and the lower cylinder 200 of the TMS are pulled apart by the gravity of the submersible. The submersible continues to dive freely to an operating depth. The lower cylinder 200 of the TMS is in the positive buoyancy state and is always above the submersible.

Figure 5:
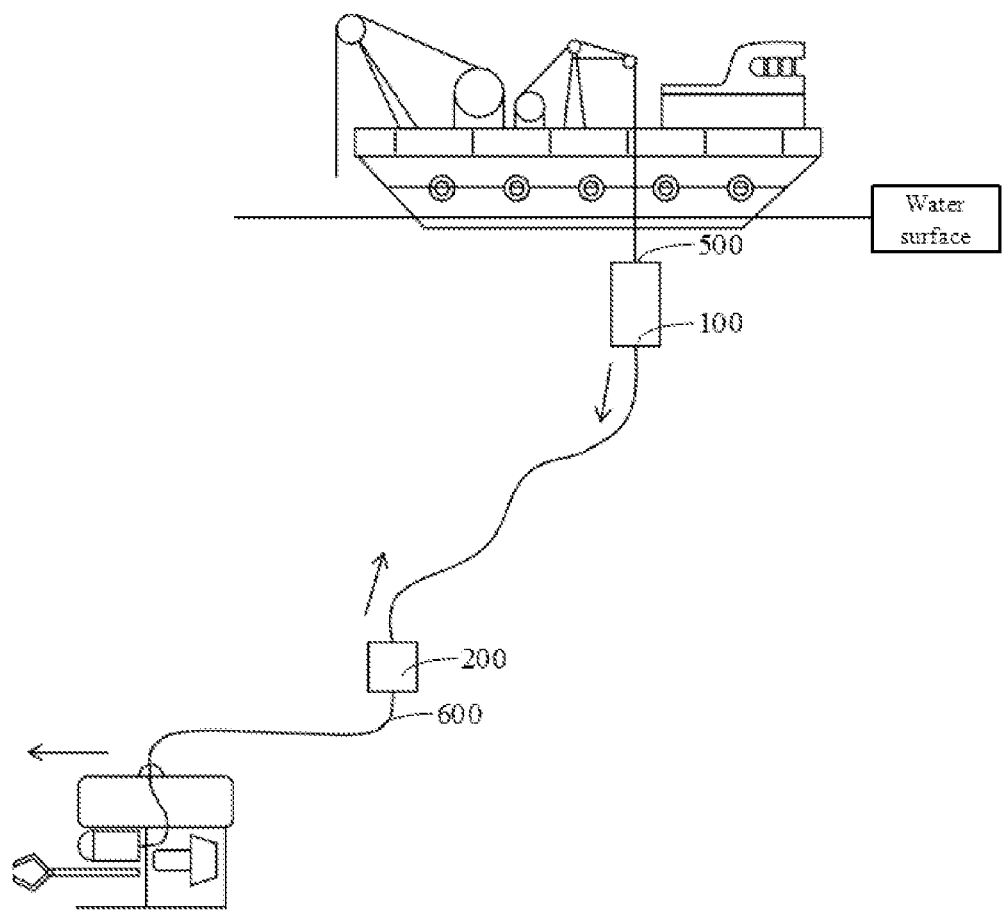
FIG. 5 is a schematic diagram of a tether manage system (TMS) in a fourth state of use.

As shown in FIG. 5, the submersible performs a cruising action, and the lower cylinder 200 of the TMS is located at a rear and upper part of the submersible to drag the light load-bearing optical fibre cable 600 to prevent the light load-bearing optical fibre cable 600 from falling, so as to avoid the light load-bearing optical fibre cable 600 from being twisted into propulsion equipment of the submersible or entangled with protruding equipment of the submersible.

According to the TMS for the optical fibre remote control submersible, the upper cylinder 100 and the lower cylinder 200 are sleeved and combined with each other after the iron plates 220 are attracted to the electromagnets 130, and the upper cylinder 100 and the lower cylinder 200 are separated after the iron plates 220 are separated from the electromagnets 130. The TMS has a low dead-weight, low requirements for an optical and power composite cable and a laying winch, thus improving an applicability of a system.

In addition, the submersible and TMS are laid out separately, so that various mechanical structures such as hooks, latches, locking and the like that may be set up for the conventional TMS to carry a large-quality submersible are avoided. With a form of direct attraction by the electromagnets 130, an attraction and the separation are fast and reliable, thus simplifying a system scheme and an operation flow.

After the TMS is separated, the lower cylinder 200 is always above or behind the submersible, so as to prevent the optical fibre cable from being entangled with the protruding equipment of the submersible or twisted into the propulsion equipment, thus effectively ensuring operational safeties of the optical fibre cable and the submersible. Meanwhile, the lower cylinder 200 may also be used as an auxiliary means for recycling, and the submersible may be towed to a vicinity of the mother ship, so as to facilitate a subsequent hook recycling.

In this embodiment, a junction box 110 is installed in the upper cylinder 100, and the light armoured optical and power composite cable 500 is divided into an optical cable and power cables through the junction box 110. the power cables of the light armoured optical and power composite cable 500 are electrically connected with the electromagnets 130, and the optical cable of the light armoured optical and power composite cable 500 is optically connected with the light load-bearing optical fibre cable 600. Since the structures are connected clearly, an assembly and maintenance are more convenient.

In this embodiment, an upper optical fibre package 120 and a lower optical fibre package 210 are respectively installed in the upper cylinder 100 and the lower cylinder 200; the optical cable of the light armoured optical and power composite cable 500 is connected into the upper optical fibre package 120, and the light load-bearing optical fibre cable 600 is connected into the lower optical fibre package 210; and the optical cable of the light armoured optical and power composite cable 500 and the light load-bearing optical fibre cable 600 respectively draw a part from the respective optical fibre package and connect each other optically. When the upper cylinder 100 and the lower cylinder 200 are separated, the cables drawn from the respective optical fibre package are used for an extension between the upper cylinder 100 and the lower cylinder 200.

In this embodiment, two mutually sleeved transparent covers 300 are respectively installed on opposite faces of the upper optical fibre package 120 and the lower optical fibre package 210, and the optical cable of the light armoured optical and power composite cable 500 and the light load-bearing optical fibre cable 600 respectively draw a part of optical fibres from the respective optical fibre package to connect into the transparent covers 300, so as to prevent a scouring of a water flow.

In this embodiment, the electromagnets 130 are circumferentially arranged along an inner wall of the upper cylinder 100; and the iron plates 220 are circumferentially arranged along an inner wall of the lower cylinder 200, and correspond to each electromagnet 130 one by one.

In this embodiment, load-bearing joints 400 are fixed at one end of the lower cylinder 200 far away from the upper cylinder 100, and the iron plates 220 are fixed on the load-bearing joints 400 by connecting rods 240 passing through the lower cylinder 200. There is a tapered groove 410 in the load-bearing joints 400, and a tip of the tapered groove 410 faces away from the lower cylinder 200. The light load-bearing optical fibre cable 600 passes through the tapered groove 410, and a stopper 610 is solidified in the tapered groove 410, thus ensuring a reliable connection between the light load-bearing optical fibre cable 600 and the load-bearing joints 400. Among them, the light load-bearing optical fibre cable 600 has a long length, about tens of meters, for an easy recovery.

In this embodiment, the light load-bearing optical fibre cable 600 adopts a fibre material as a load-bearing layer. The fibre material may not only obtain an enough strength, but also reduce a weight in water, such as aramid fibre.

In this embodiment, the light load-bearing optical fibre cable 600 is also optically connected with a local optical fibre package in the submersible. An optical fibre link of a whole submersible system is used to realize a remote control on the water surface and a communication.

The above-mentioned embodiments are only several embodiments of the application, and descriptions are more specific and detailed, but they should not be construed as limiting the scope of the application. It should be pointed out that for those skilled in the art, without departing from a concept of the application, several modifications and improvements may be made, all of which fall in the scope of protection of the application. Therefore, the scope of protection of the application should be subject to the appended claims.

What is claimed is:

1. A tether manage system (TMS) for an optical fibre remote control submersible, comprising:
    an upper cylinder equipped with a counterweight, and
    a lower cylinder equipped with a buoy,
    wherein the upper cylinder and the lower cylinder are sleeved with each other, and matched electromagnets and iron plates are respectively installed in the upper cylinder and the lower cylinder; the upper cylinder is connected with a mother ship through a light armoured optical and power composite cable, and the light armoured optical and power composite cable is configured to provide electric power for the electromagnets, and the lower cylinder is connected with a submersible through a light load-bearing optical fibre cable; and an end of the light armoured optical and power composite cable inside the upper cylinder is optically connected with an end of the light load-bearing optical fibre cable inside the lower cylinder;
    wherein load-bearing joints are fixed at one end of the lower cylinder away from the upper cylinder, and the iron plates are fixed on the load-bearing joints by connecting rods passing through the lower cylinder.

2. The TMS for the optical fibre remote control submersible according to claim 1, wherein a junction box is installed in the upper cylinder, and the light armoured optical and power composite cable is divided into an optical cable and power cables through the junction box.

3. The TMS for the optical fibre remote control submersible according to claim 2, wherein the power cables of the light armoured optical and power composite cable are electrically connected with the electromagnets, and the optical cable of the light armoured optical and power composite cable is optically connected with the light load-bearing optical fibre cable.

4. The TMS for the optical fibre remote control submersible as claimed in claim 3, wherein an upper optical fibre package and a lower optical fibre package are respectively installed in the upper cylinder and the lower cylinder; the optical cable of the light armoured optical and power composite cable is connected into the upper optical fibre package, and the light load-bearing optical fibre cable is connected into the lower optical fibre package; and the optical cable of the light armoured optical and power composite cable and the light load-bearing optical fibre cable respectively draw a part of optical fibres from the upper optical fibre package and the lower optical fibre package, respectively, and connect each other optically.

5. The TMS for the optical fibre remote control submersible as claimed in claim 4, wherein two mutually sleeved transparent covers are respectively installed on opposite faces of the upper optical fibre package and the lower optical fibre package, and the optical cable of the light armoured optical and power composite cable and the light load-bearing optical fibre cable respectively draw the part of the optical fibres from the upper optical fibre package and the lower optical fibre package, respectively, to connect into the two mutually sleeved transparent covers.

6. The TMS for the optical fibre remote control submersible as claimed in claim 1, wherein the electromagnets are circumferentially arranged along an inner wall of the upper cylinder; and the iron plates are circumferentially arranged along an inner wall of the lower cylinder, and the iron plates are in one-to-one correspondence with the electromagnets.

7. The TMS for the optical fibre remote control submersible according to claim 1, wherein a tapered groove is formed in the load-bearing joints, and a tip of the tapered groove faces away from the lower cylinder; the light load-bearing optical fibre cable passes through the tapered groove, and a stopper is solidified in the tapered groove.

8. The TMS for the optical fibre remote control submersible according to claim 1, wherein the light load-bearing optical fibre cable adopts a fibre material as a load-bearing layer.

9. The TMS for the optical fibre remote control submersible according to claim 1, wherein the light load-bearing optical fibre cable is also optically connected with a local optical fibre package in the submersible.

10. A tether manage system (TMS) for an optical fibre remote control submersible, comprising:
    an upper cylinder equipped with a counterweight, and
    a lower cylinder equipped with a buoy,
    wherein the upper cylinder and the lower cylinder are sleeved with each other, and matched electromagnets and iron plates are respectively installed in the upper cylinder and the lower cylinder; the upper cylinder is connected with a mother ship through a light armoured optical and power composite cable, and the light armoured optical and power composite cable is configured to provide electric power for the electromagnets, and the lower cylinder is connected with a submersible through a light load-bearing optical fibre cable; and an end of the light armoured optical and power composite cable inside the upper cylinder is optically connected with an end of the light load-bearing optical fibre cable inside the lower cylinder;

wherein a junction box is installed in the upper cylinder, and the light armoured optical and power composite cable is divided into an optical cable and power cables through the junction box;

wherein the power cables of the light armoured optical and power composite cable are electrically connected with the electromagnets, and the optical cable of the light armoured optical and power composite cable is optically connected with the light load-bearing optical fibre cable;

wherein an upper optical fibre package and a lower optical fibre package are respectively installed in the upper cylinder and the lower cylinder; the optical cable of the light armoured optical and power composite cable is connected into the upper optical fibre package, and the light load-bearing optical fibre cable is connected into the lower optical fibre package; and the optical cable of the light armoured optical and power composite cable and the light load-bearing optical fibre cable respectively draw a part of optical fibres from the upper optical fibre package and the lower optical fibre package, respectively, and connect each other optically; and wherein two mutually sleeved transparent covers are respectively installed on opposite faces of the upper optical fibre package and the lower optical fibre package, and the optical cable of the light armoured optical and power composite cable and the light load-bearing optical fibre cable respectively draw the part of the optical fibres from the upper optical fibre package and the lower optical fibre package, respectively, to connect into the two mutually sleeved transparent covers.

* * * * *